May 18, 1926.
L. A. TAYLOR
STERILIZER
Filed Oct. 5, 1922
1,585,215
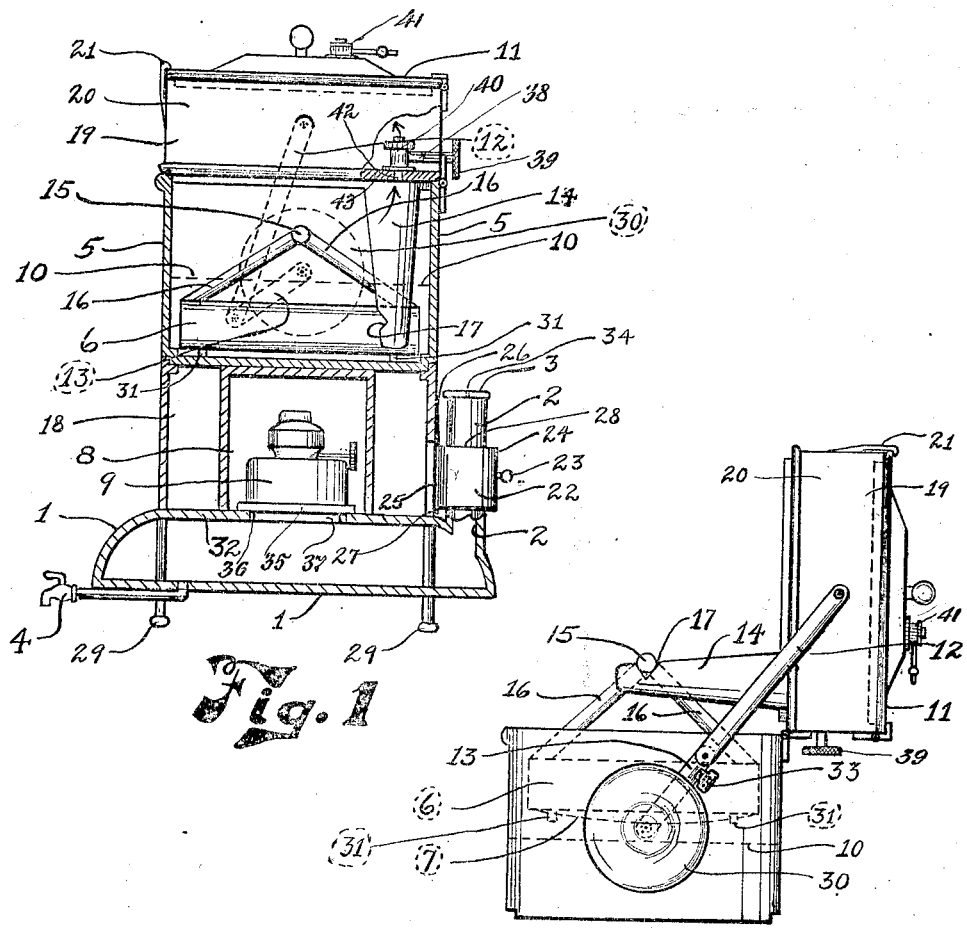
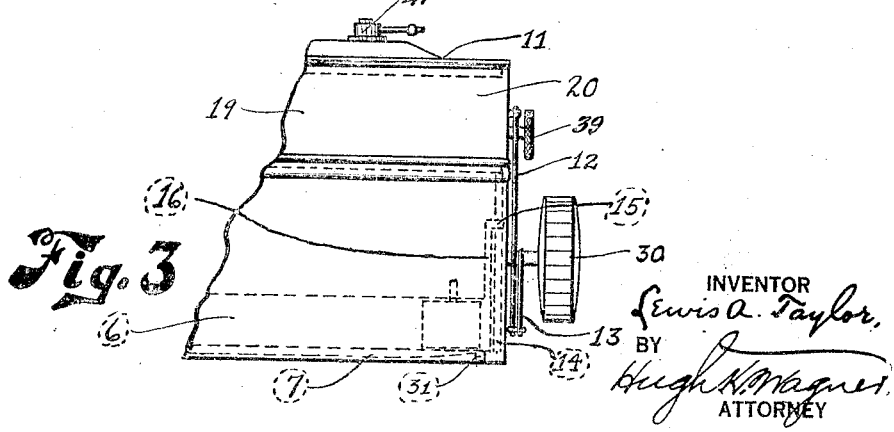
INVENTOR
Lewis A. Taylor,
BY
Hugh K. Wagner
ATTORNEY Patented May 18, 1926.

1,585,215

UNITED STATES PATENT OFFICE.

LEWIS A. TAYLOR, OF COLE CAMP, MISSOURI, ASSIGNOR OF ONE-HALF TO J. H. HULL, OF COLE CAMP, MISSOURI.

STERILIZER.

Application filed October 5, 1922. Serial No. 592,512.

The especial object of this sterilizer is to combine in one compact structure for the convenience of dentists a warm water compartment in the base and a wet and dry inlay mold drier together with the sterilizing compartment.

In the sterilizing compartment the dentist's instruments can be sterilized. This is accomplished in boiling water. There is, also, a dry sterilizer located over the boiling water, in which dry sterilizer gauze and paper points for root canal work and cotton rolls and cotton pellets can be subjected to dry sterilization. In this compartment the materials mentioned and others like them can not burn, because heated by steam from the boiling water in the instrument sterilizer.

Furthermore, there is provided in the same construction in the base a compartment for hot water, which water will not boil, but will be kept hot by proximity to the sterilizing compartment containing boiling water. This warm water will be used for rinsing and similar purposes.

Heated from the same common source of warmth is a drier for molds for casting work, such as inlays, three-fourths crowns, and similar work. Due to this arrangement these molds, crowns, and the like will be dried by an even heat, which may be either slow or rapid as desired, because the said drier is located near to the burner.

This combination arrangement makes the device as a whole one that is very convenient for dentists and very economical to manufacture.

It may be equipped with either an alcohol or a gas burner or with electric heating means.

It is suitable for the use of surgeons and others in addition to dentists.

In the accompanying drawings forming part of this specification, in which like numbers of reference denote like parts wherever they occur, Figure 1 is a vertical sectional view;
Figure 2 is a side elevation; and
Figure 3 is a partial front elevation.

The hot water tank 1 will preferably be made of sheet copper and will be built to withstand continuous temperature of boiling water. Access is afforded to it by pipe 2 controlled by the cap 3. Hot water may be drawn from it through the faucet 4 for any of the uses of a dentist or surgeon including that of filling the sterilizer tank 5 for the sterilization of instruments. In sterilizing tank 5, is contained instrument tray 6, preferably having thin copper sides and a fine copper gauze bottom 7.

Compartment 8 contains alcohol lamp 9 or a gas burner or an electric heater or some other heating device.

The warm water tank 1 serves as a base for the device. The heater 9 is located adjacent thereto and imparts heat continuously to the hot water in tank 1. Whenever the surgeon or dentist desires to sterilize his instruments he draws enough water out of faucet 4 to reach the water-line 10. He places his instruments in tray 6 and closes the lid 11. By the movement of closing the lid 11 the arms 12 are pushed downward and with them the arms 13 and, also, the arms 14, whereby the tray 6 is lowered in tank 5 below the water-line 10. When the instruments have been subjected for a sufficient length of time to the sterilizing heat of the water, the lid 11 is opened from the position shown in Figure 1 to that depicted in Figure 2, whereby the arms 14 are raised from the position shown in Figure 1 to that illustrated in Figure 2, resulting in rod 15, attached by hangers 16 to tray 6, seating in notch 17 in arms 14, by which means tray 6 is lifted above the water line 10 (as shown in Figure 2), which allows the instruments to drain through the gauze bottom 7 of tray 6. The instruments can then be stored in compartment 18, access to which is afforded by a door or the like (not shown in the drawing). The instruments may, also, be placed in the compartment 19 within lid 11, access to which compartment is afforded by door 20 fastened by latch 21.

For the drying of molds, crowns, and the like, receptacle 22 is provided, which is equipped with a handle 23 and a front 24 and back 25, the front 24 forming flange 26 and the back 25 forming the flange 27, so that the receptacle 22 will be larger in part than opening 28. The receptacle 22 opens toward the top and can be slid in opening 28, so as to afford access to it.

A plurality of legs or feet 29 raises base or tank 1 off any article of furniture on which the same may be placed.

Compartment 18 is a hot-air chamber and withstands continuous heat from the heater 9.

Compartment 19 is a dry heat compartment and must stand continuous heat from the steam within tank 5.

Hand-wheel 30 is the means whereby lid 11 is raised, which is by simple rotation clockwise, which rotation first affects arm 13 and then arm 12, which results in moving lid 11 from the position shown in Figure 1 to that shown in Figure 2.

Pins 31 provide rests for the bottom of tray 6, so that the water in tank 5 will be underneath the same as well as above and around it.

Since heat rises the water in compartment 5 will be heated to a higher temperature than that in tank 1. Moreover, the heat from burner 9 is directly applied to the bottom of tank 5, but not to the bottom of tank 1.

It will be observed that one central heating means serves a variety of useful purposes and supplies the necessary heat to a plurality of compartments and that all of these compartments are united to and supported by a single base.

The flange 27 rests upon the top wall 32 of the tank 1.

The stop 33 limits the movement of arm 13 when slightly past center, when the lid 11 is in the position shown in Figure 2.

A pinhole 34 in cap 3 allows for the escape of pressure. Pipe 2 is for filling tank 1.

It will be observed that the lid 35 covers the opening 36, in the lid 32, of compartment 1. A projection 37 extends downwardly from lid 35, so as to fit like a stopper in opening 36. This construction permits access to the interior of compartment 1, in case of stoppage or other necessity. In such an event the burner 9, lid 35, and plug 37 can be lifted out as one piece, because they will all be connected together. A needle-valve 38, controlled by knob 39, governs the exit of live steam in the direction shown by the arrows in Figure 1 from the interior of sterilizing-tank 5 to the compartment 19 through stuffing-box 40. This permits thorough steaming of everything in compartment 19, after which further admission of steam can be cut off by valve 38. Then the interior and contents of compartment 19 dry.

Safety or escape-valve 41 in the top of lid 11 permits the escape of surplus steam.

The steam passing from tank 5 to compartment 19 will travel through port 42, in the partition 43, between tank 5 and compartment 19. The stuffing-box 40 and valve 38 will preferably be located within compartment 19.

Having thus described this invention, I hereby reserve the benefit of all changes in form, arrangement, order, or use of parts, as it is evident that many minor changes may be made therein without departing from the spirit of this invention or the scope of the following claims.

I claim:

1. In combination, a heater containing compartment, a hollow base below said compartment for insulating the same from its support, said base compartment being arranged to receive water whereby excessive heating of the walls of said base compartment is prevented, a water boiling compartment immediately above the heater containing compartment, said base compartment having draw off means whereby preheated water may be drawn therefrom for transference to the boiling compartment, and a lid for said water boiling compartment to retain heat therein, said lid being hollow to provide a dead air insulating space and having a normally closed access opening whereby the lid may also serve for receiving objects for dry heating to a temperature in the boiling compartment.

2. A sterilizing device presenting a heating compartment, a heater therein, a water compartment below and adjacent to the heating compartment, a water compartment above the heating compartment and having its bottom subjected to the direct action of the heater whereby the water contained therein is heated to a higher temperature than the water in the lower compartment, an instrument-supporting tray submerged in the water of the said upper compartment, and a lid closing the said upper compartment and having a hollow interior provided with a steam inlet in communication with said upper compartment and presenting a dry sterilizing compartment.

In testimony whereof I hereunto affix my signature.

LEWIS A. TAYLOR.